US010947854B2

(12) United States Patent
Quach et al.

(10) Patent No.: US 10,947,854 B2
(45) Date of Patent: *Mar. 16, 2021

(54) INTERNAL COOLING CAVITY WITH TRIP STRIPS

(71) Applicant: United Technologies Corporation, Farmington, CT (US)

(72) Inventors: San Quach, East Hartford, CT (US); Atul Kohli, Tolland, CT (US); Matthew A. Devore, Rocky Hill, CT (US); Steven Bruce Gautschi, Naugatuck, CT (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/793,575

(22) Filed: Feb. 18, 2020

(65) Prior Publication Data

US 2020/0182070 A1 Jun. 11, 2020

Related U.S. Application Data

(63) Continuation of application No. 14/602,035, filed on Jan. 21, 2015, now Pat. No. 10,605,094.

(51) Int. Cl.
*F01D 5/18* (2006.01)
(52) U.S. Cl.
CPC .............. *F01D 5/187* (2013.01); *F01D 5/186* (2013.01); *F05D 2240/304* (2013.01); *F05D 2260/201* (2013.01); *Y02T 50/60* (2013.01)
(58) Field of Classification Search
CPC .................................................... F01D 5/187
See application file for complete search history.

(56) References Cited

U.S. PATENT DOCUMENTS

| 5,263,820 A | 11/1993 | Tubbs |
| 5,352,091 A | 10/1994 | Sylvestro |
| 5,667,359 A | 9/1997 | Huber |
| 5,738,493 A | 4/1998 | Lee |

(Continued)

FOREIGN PATENT DOCUMENTS

| EP | 1035302 | 9/2000 |
| EP | 1793083 | 6/2007 |

(Continued)

OTHER PUBLICATIONS

Je-Chin Han, Lesley M. Wright "4.2.2.2 Enhanced Internal Cooling of Turbine Blades and Vanes," Turbine Heat Transfer Laboratory Department of Mechanical Engineering Texas A&M University College Station, Texas, available at: https://www.netl.doe.gov/File%20Library/Research/Coal/energy%20systems/turbines/handbook/4-2-2-2.pdf dated Oct. 30, 2014 is by webarchive.org.

(Continued)

*Primary Examiner* — Justin D Seabe
*Assistant Examiner* — Michael L Sehn
(74) *Attorney, Agent, or Firm* — Snell & Wilmer L.L.P.

(57) ABSTRACT

An airfoil is provided. The airfoil may comprise a cross over, an impingement chamber in fluid communication with the cross over, and a first trip strip disposed on a first surface of the impingement chamber. A cooling system is also provided. The cooling system may comprise an impingement chamber, a first trip strip on a first surface of the impingement chamber, and a second trip strip on a second surface of the impingement chamber. An internally cooled engine part is further provided. The internally cooled part may comprise a cross over and an impingement chamber in fluid communication with the cross over. The cross over may be configured to direct air towards a first surface of the impingement chamber. A first trip strip may be disposed on the first surface of the impingement chamber.

17 Claims, 8 Drawing Sheets

(56) References Cited

U.S. PATENT DOCUMENTS

| | | | |
|---|---|---|---|
| 6,174,134 B1 | 1/2001 | Lee | |
| 6,331,098 B1 | 12/2001 | Lee | |
| 6,406,260 B1 * | 6/2002 | Trindade | F01D 5/187 |
| | | | 415/115 |
| 6,607,356 B2 | 8/2003 | Manning | |
| 7,097,426 B2 | 8/2006 | Lee | |
| 7,530,789 B1 | 5/2009 | Liang | |
| 7,670,112 B2 | 3/2010 | Boury | |
| 7,690,892 B1 | 4/2010 | Liang | |
| 7,780,415 B2 | 8/2010 | Liang | |
| 8,096,771 B2 | 1/2012 | Liang | |
| 8,511,968 B2 | 8/2013 | Liang | |
| 10,605,094 B2 * | 3/2020 | Quach | F01D 5/187 |
| 2003/0133795 A1 | 7/2003 | Manning | |
| 2010/0303635 A1 | 12/2010 | Townes | |
| 2011/0286857 A1 | 11/2011 | Gleiner | |
| 2012/0328450 A1 | 12/2012 | Spangler | |
| 2013/0142666 A1 | 6/2013 | Lee | |
| 2014/0212297 A1 | 7/2014 | Goeller | |

FOREIGN PATENT DOCUMENTS

| | | |
|---|---|---|
| EP | 2236751 | 10/2010 |
| WO | 2014112968 | 7/2014 |
| WO | 2014159589 | 10/2014 |
| WO | 2014159800 | 10/2014 |
| WO | 2014175937 | 10/2014 |
| WO | 2015065671 | 5/2015 |

OTHER PUBLICATIONS

Je-Chin Han, Book "Gas Turbine Heat Transfer and Cooling Technology," Sandip Dutta, Srinath Ekkad, CRC Press Taylor & Francis Group, 2013.

D14bis: the dating of D14 of Oct. 30, 2014 is by webarchive.org. European Patent Office, Opposition to the European Patent dated Jun. 11, 2018 Application No. 15194621.7.

Extended European Search Report dated Jul. 4, 2016 in European Application No. 15194621.7.

USPTO ; Pre-Interview First Office Action dated Nov. 18, 2016 in U.S. Appl. No. 14/602,035.

USPTO ; Non-Final Office Action dated Jan. 30, 2017 in U.S. Appl. No. 14/602,035.

USPTO ; Final Office Action dated May 17, 2017 in U.S. Appl. No. 14/602,035.

USPTO ; Advisory Action dated Jul. 25, 2017 in U.S. Appl. No. 14/602,035.

USPTO ; Non-Final Office Action dated Aug. 31, 2017 in U.S. Appl. No. 14/602,035.

USPTO ; Final Office Action dated Dec. 28, 2017 in U.S. Appl. No. 14/602,035.

USPTO ; Advisory Action dated Mar. 30, 2018 in U.S. Appl. No. 14/602,035.

USPTO ; Non-Final Office Action dated Apr. 18, 2018 in U.S. Appl. No. 14/602,035.

USPTO ; Final Office Action dated Sep. 20, 2018 in U.S. Appl. No. 14/602,035.

USPTO ; Advisory Action dated Nov. 15, 2018 in U.S. Appl. No. 14/602,035.

USPTO ; Non-Final Office Action dated Jan. 24, 2019 in U.S. Appl. No. 14/602,035.

USPTO ; Final Office Action dated Jun. 20, 2019 in U.S. Appl. No. 14/602,035.

USPTO ; Advisory Action dated Aug. 28, 2019 in U.S. Appl. No. 14/602,035.

USPTO ; Notice of Allowance dated Nov. 19, 2019 in U.S. Appl. No. 14/602,035.

* cited by examiner

INTERNAL COOLING CAVITY WITH TRIP STRIPS

CROSS REFERENCE TO RELATED APPLICATIONS

This application is a continuation of, claims priority to and the benefit of, U.S. Ser. No. 14/602,035 filed Jan. 21, 2015 and entitled "INTERNAL COOLING CAVITY WITH TRIP STRIPS," which is hereby incorporated by reference in its entirety for all purposes.

GOVERNMENT LICENSE RIGHTS

This disclosure was made with government support under contract No. N00019-12-D-0002 awarded by the United States Navy. The government has certain rights in the disclosure.

FIELD OF INVENTION

The present disclosure relates to gas turbine engines, and, more specifically, to flow guides for air and/or coolant flowing through impingement cavities.

BACKGROUND

Turbine airfoils or outer air seals operate in an environment where the gas temperatures often exceed the thermal capacity of materials in the engine. These parts may rely on cooling features to protect against damage. Cooling air from the compressor can be routed to provide internal convection cooling within the airfoils. However, more cooling air bled from the compressor and used for cooling means less gas is available for work extraction. Thus, engine efficiency may be reduced if higher amounts of cooling air are consumed. As demands increase for higher thrust and/or efficiency, the turbine inlet temperatures are increased while the gas allocated for cooling is reduced.

Some components may implement air cooling systems with a series of internal cavities to cool a part. In some instances, the air recirculates in an uncontrolled pattern before being bled off into another region of the part. The erratic air recirculation patterns may limit the efficacy of internal flow cooling systems.

SUMMARY

An airfoil comprises a cross over, an impingement chamber in fluid communication with the cross over, and a first trip strip disposed on a first surface of the impingement chamber.

In various embodiments, a second trip strip is disposed on a second surface of the impingement chamber. The first trip strip may have a first geometry and the second trip strip may have a second geometry different from the first geometry. The first trip strip and the second trip strip may be configured to direct air flow in a vortex motion. An exit passage may be in fluid communication with the first trip strip and the second trip strip. The first trip strip may be configured to direct a first portion of the air flow into the exit passage and a second portion of the air flow to the second trip strip. The first trip strip may comprise a v-shaped geometry. The first trip strip may also comprise at least one of a circular, elliptical, wave, or linear geometry.

A cooling system comprises an impingement chamber, a first trip strip on a first surface of the impingement chamber, and a second trip strip on a second surface of the impingement chamber.

In various embodiments, a channel may be in fluid communication with the impingement chamber, wherein the channel is configured to direct cooling fluid onto the first trip strip and the first surface of the impingement chamber. The first trip strip may comprise a v-shaped geometry. The first trip strip may also comprise at least one of a circular, elliptical, wave, or linear geometry. An exit passage may be in fluid communication with the first trip strip and the second trip strip. The first trip strip may be configured to direct a first portion of cooling fluid into the exit passage and a second portion of the cooling fluid to the second trip strip. The first trip strip may have a first geometry and the second trip strip may have a second geometry different from the first geometry. The first trip strip and the second trip strip may be configured to direct cooling fluid in a vortex motion in the impingement chamber.

An internally cooled engine part may comprise a cross over and an impingement chamber in fluid communication with the cross over. The cross over may be configured to direct air towards a first surface of the impingement chamber. A first trip strip may be disposed on the first surface of the impingement chamber.

In various embodiments, a second trip strip may be disposed on a second surface of the impingement chamber that is opposite the first surface. The first trip strip and the second trip strip may be configured to direct the air in a vortex motion in the impingement chamber. The first trip strip may comprise a v-shaped geometry.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
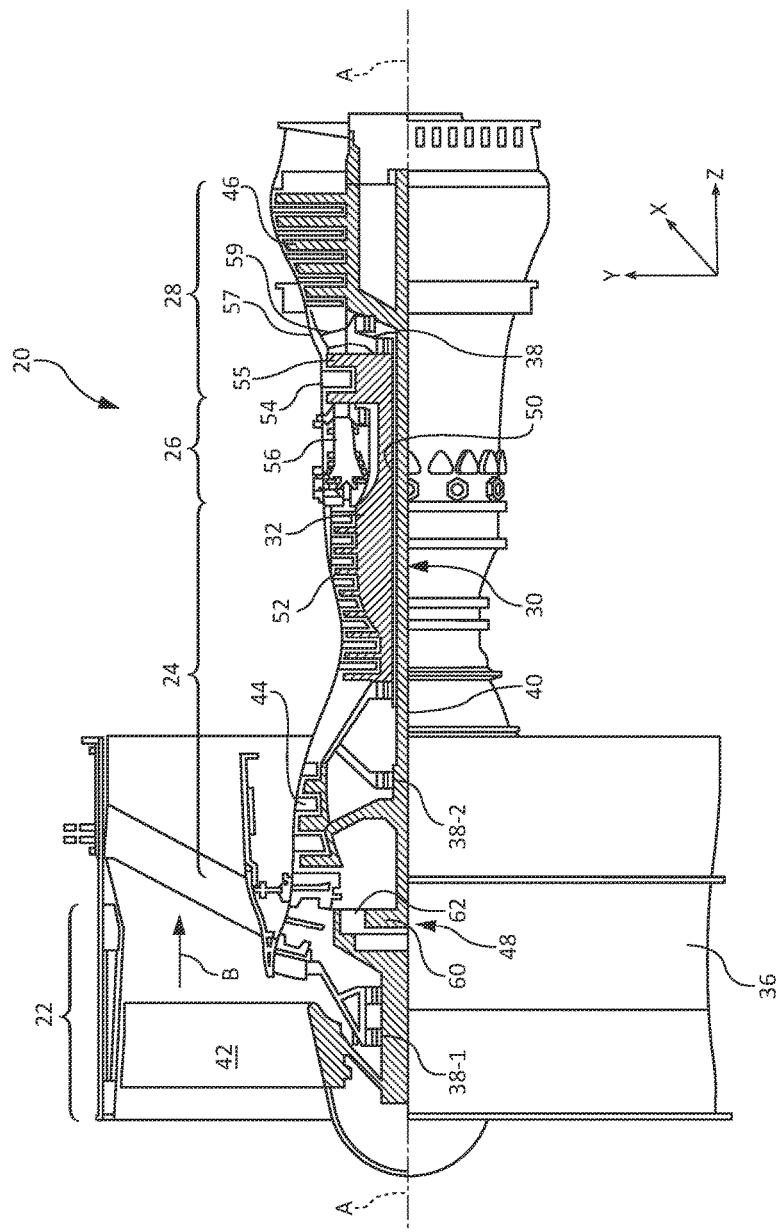
FIG. 1 illustrates an exemplary embodiment of a gas-turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive coolant along a core flow-path for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low-pressure compressor 44 and a low-pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high-pressure compressor 52 and high-pressure turbine 54. Airfoils 55 of high-pressure turbine may rotate about the engine central longitudinal axis A-A'. Airfoil 55 may be an internally cooled component of gas turbine engine 20. Trip strips may be located in internal cooling cavities of internally cooled engine parts, as detailed further below. Internally cooled engine parts may be discussed in the present disclosure in terms of airfoils. However, the present disclosure applies to any internally cooled engine part (e.g., blade outer air seals, airfoil platforms, combustor components, or any other internally cooled component in a gas turbine engine).

A combustor 56 may be located between high-pressure compressor 52 and high-pressure turbine 54. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high-pressure" compressor or turbine experiences a higher pressure than a corresponding "low-pressure" compressor or turbine.

The core airflow C may be compressed by low-pressure compressor 44 then high-pressure compressor 52, mixed and burned with fuel in combustor 56, then expanded over high-pressure turbine 54 and low-pressure turbine 46. Mid-turbine frame 57 includes airfoils 59, which are in the core airflow path. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low-pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low-pressure compressor 44. Low-pressure turbine 46 pressure ratio may be measured prior to inlet of low-pressure turbine 46 as related to the pressure at the outlet of low-pressure turbine 46 prior to an exhaust nozzle. It should be understood, however, that the above parameters are exemplary of various embodiments of a suitable geared architecture engine and that the present disclosure contemplates other turbine engines including direct drive turbofans.

Figure 2:
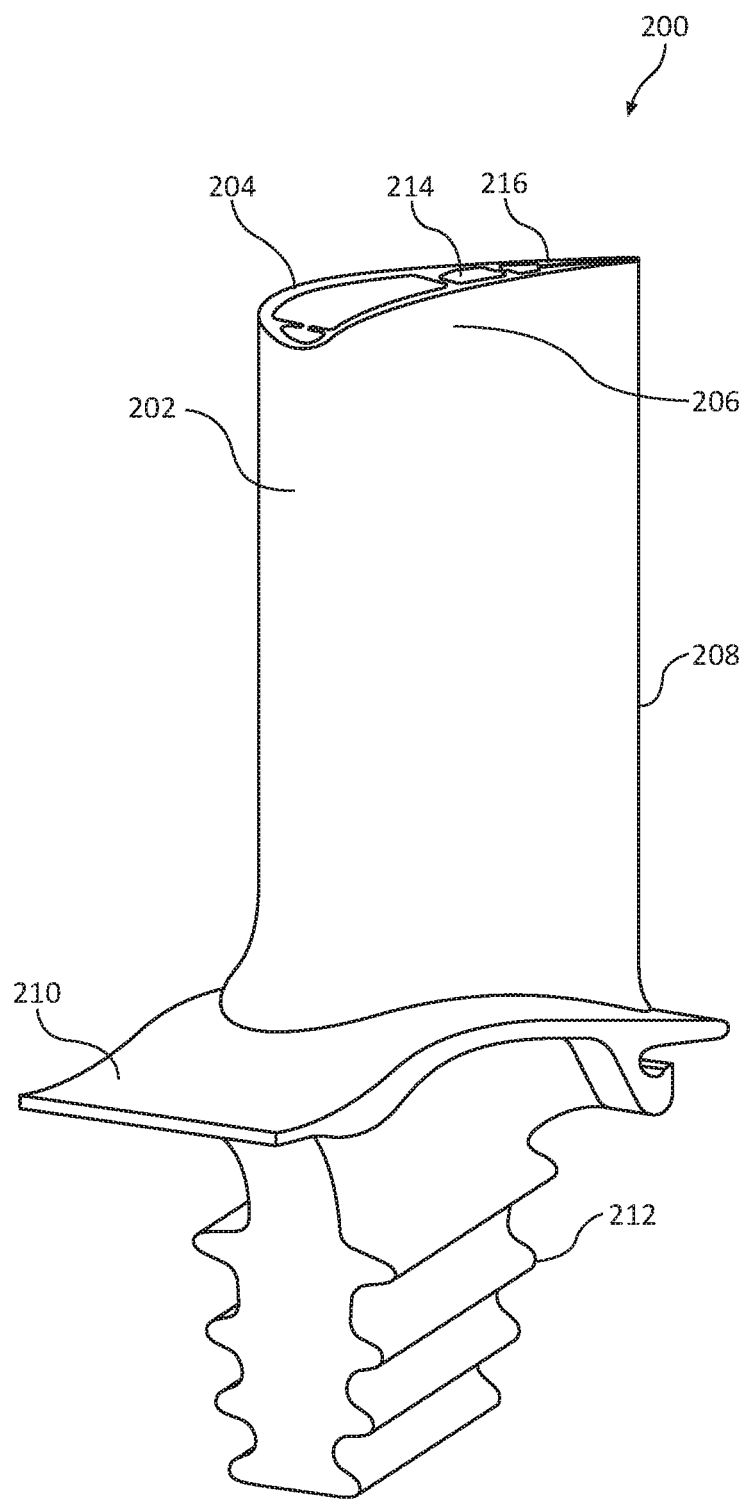
FIG. 2 illustrates an airfoil with internal cavities for coolant flow, in accordance with various embodiments.
Figure 3:
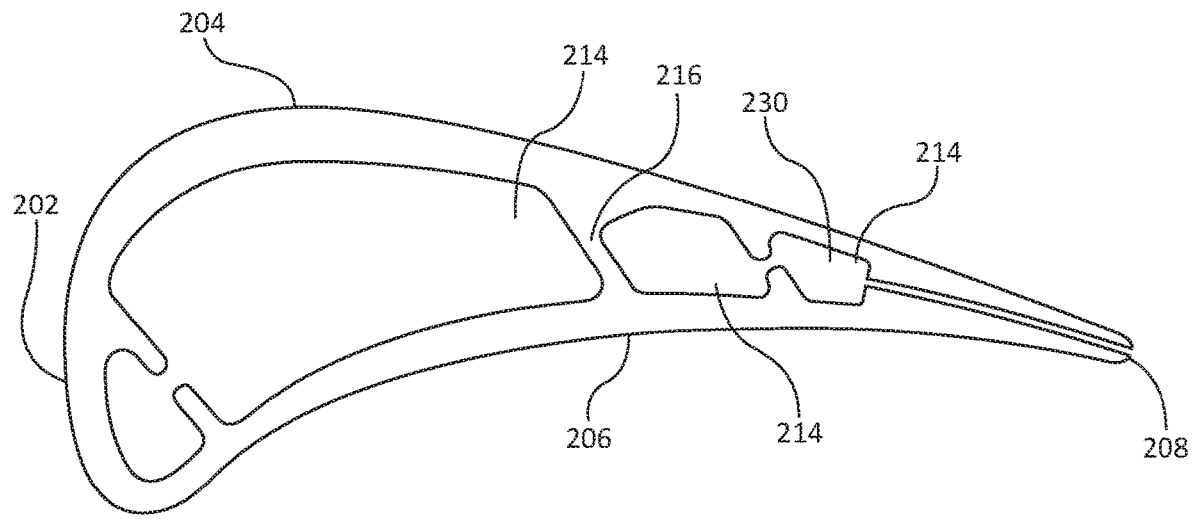
FIG. 3 illustrates a cross-sectional view of an airfoil with internal cavities for coolant flow, in accordance with various embodiments.

With reference to FIGS. 2 and 3, an airfoil 200 with internal cavities 214 for carrying coolant flow (e.g., air flow) is shown according to various embodiments. Although an airfoil is shown, the present disclosure applies to any internally cooled part (e.g., blade outer air seals, airfoil platforms, combustor components, etc.). Airfoil 200 may comprise leading edge 202 and trailing edge 208. Air flowing through a gas turbine engine may first contact leading edge 202. Air may flow along suction side 204 and/or pressure side 206 and leave airfoil at trailing edge 208. Airfoil 200 may include a blade platform 210 and an attachment root 212. Airfoil 200 is depicted as cutaway to illustrate internal cavities 214 defined by internal walls 216. Internal cavities 214 may be located throughout airfoil 200 and may provide internal cooling for airfoil 200.

Figure 4:
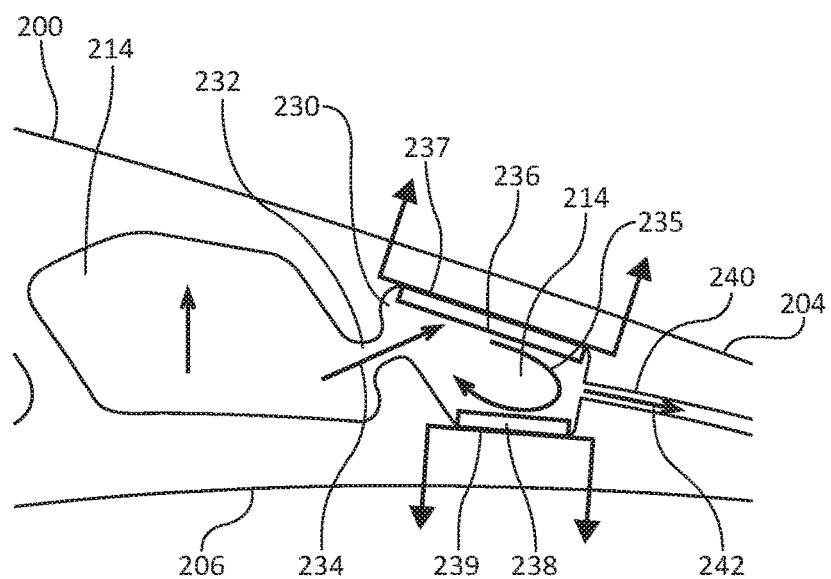
FIG. 4 illustrates a cross-sectional view of an internal cavity in an airfoil with guide features to direct cooling flow, in accordance with various embodiments.

With reference to FIG. 4, a cross-sectional view of an internal cavity 214 in an airfoil 200 with trip strips 236 and trip strips 238 to direct cooling flow, in accordance with various embodiments. Internal cavities 214 may include an aft impingement chamber 230 containing trip strips 236 disposed on an internal suction-side surface 237. Aft impingement chamber 230 may also contain trip strips 238 disposed on an internal pressure-side surface 239. A cross over 232 may be a narrow channel directing flow 234 into aft impingement chamber 230 where flow 234 impinges on internal suction-side surface 237. Cross over 232 may direct flow 234 as a jet into internal suction-side surface 237. In that regard, cross over 232 may be oriented at an angle relative to internal suction-side surface 237.

In various embodiments, flow 234 may eject from cross over 232 and contact internal suction-side surface 237 and trip strips 236. Trip strips 236 may direct flow 235 within aft impingement chamber 230 along internal suction-side surface 237. In that regard, trip strips 236 may have a tendency to prevent flow from moving radially outward as airfoil 200 rotates (as airfoil 55 from FIG. 1 rotates about engine central longitudinal axis A-A'). Trip strips 236 may also provide increased surface area along internal suction-side surface 237 to improve heat transfer between the surface of airfoil 200 and the coolant making up flow 235. Flow 242 may then be ejected from aft impingement chamber 230 by way of exit passage 240 before being ejected from airfoil 200.

Figure 5:
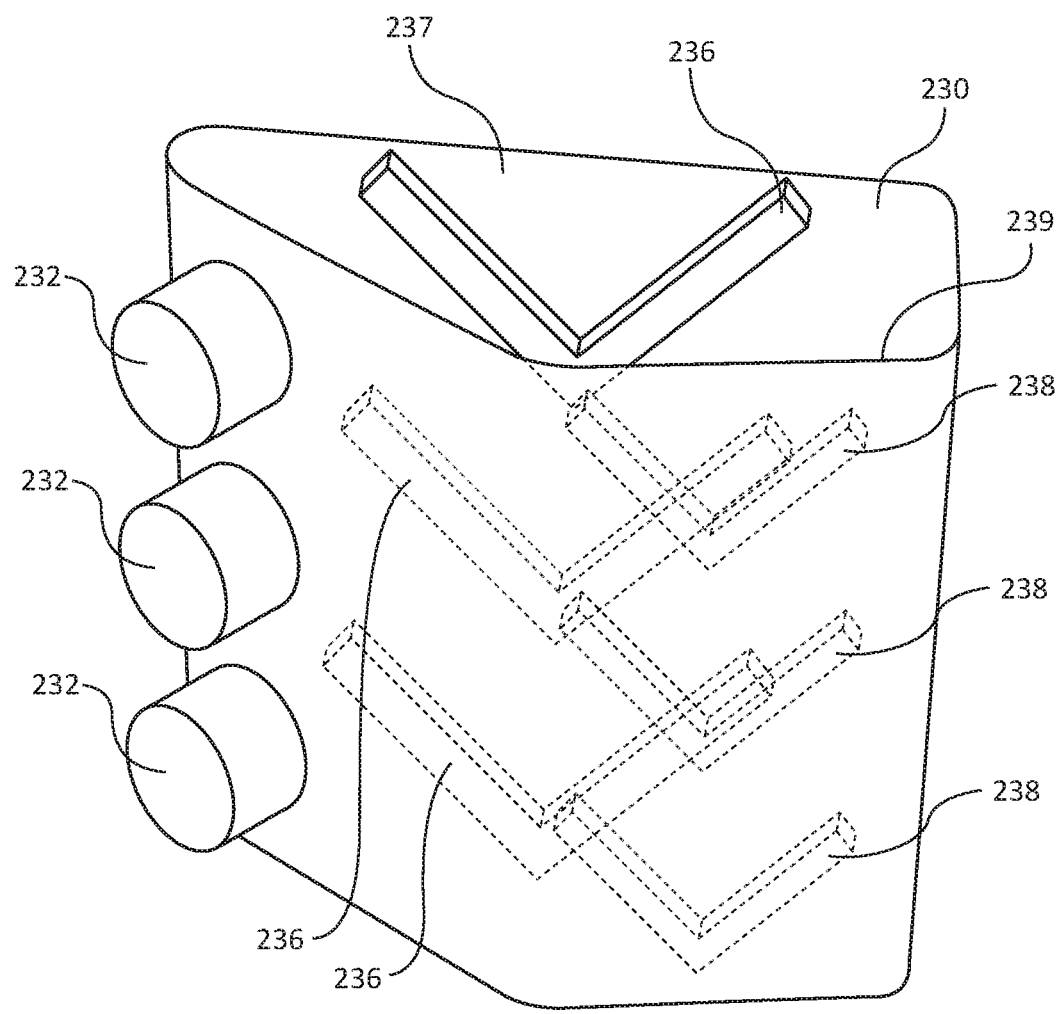
FIG. 5 illustrates an internal cavity in an airfoil with guide features to direct cooling flow from impingement cavities, in accordance with various embodiments.

With reference to FIG. 5, aft impingement chamber 230 with trip strips 236 and trip strips 238 to direct cooling flow is shown in a three-dimensional view, in accordance with various embodiments. Internal suction-side surface 237 is shown opposite internal pressure-side surface 239. Trip strips 236 are shown on internal suction-side surface 237. Trip strips 238 are disposed on internal pressure-side surface 239, which defines in the opposite side of aft impingement chamber 230 from internal suction-side surface 237. Cross overs 232 are shown as circular passages directed towards internal suction-side surface 237. Although trip strips 236 and trip strips 238 are shown with a v-shaped geometry, other geometries may also improve air flow characteristics and heat transfer within aft impingement chamber 230, as discussed further below. Similarly, although trip strips 236 and trip strips 238 are shown in aft impingement chamber 230 of airfoil 200, trip strips may be deployed in other cooling cavities in airfoil 200. In fact, any aircraft part using or comprising a part of an internal impingement chamber to provide cooling may include trip strips, for example, a blade outer air seal.

Figure 6:
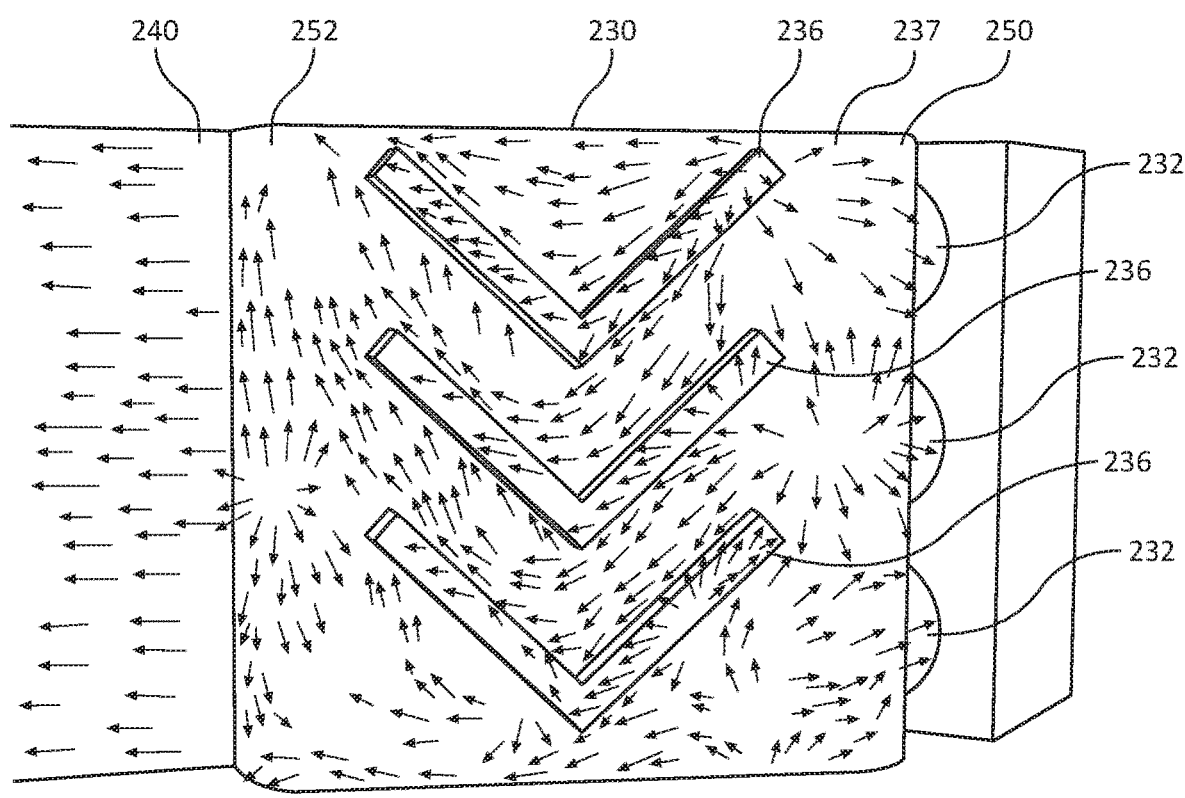
FIG. 6 illustrates the flow pattern over a suction-side surface of an impingement chamber, in accordance with various embodiments.
Figure 7:
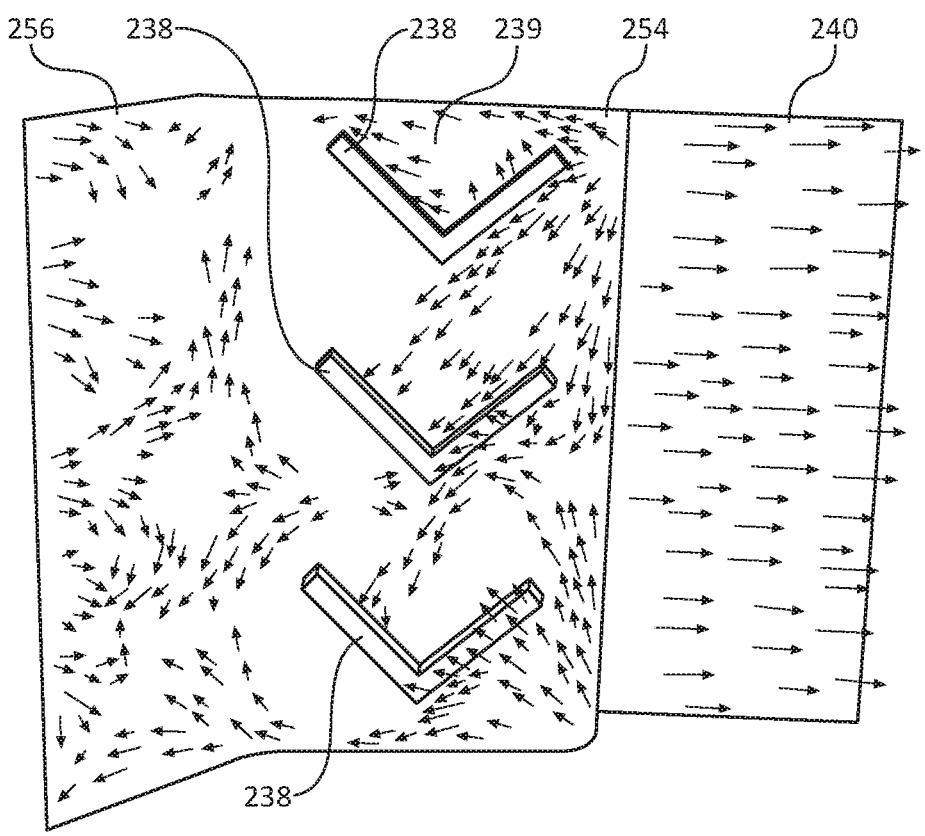
FIG. 7 illustrates a flow pattern over guide features on a pressure-side surface of an impingement chamber, in accordance with various embodiments.

With reference to FIGS. 6 and 7, the cooling flow pattern within aft impingement chamber 230 is shown as viewed through internal suction-side surface 237, in accordance with various embodiments. Cooling flow flows out from cross overs 232 and contacts internal suction-side surface 237 on forward end 250, which is adjacent to the cross overs. Cooling air flowing into aft impingement chamber 230 initially spreads and then follows roughly along the contour of trip strips 236 and across internal suction-side surface 237 to aft end 252. Trip strips 236 may act as a turbulator as well as a guide structure to air flow in aft impingement chamber 230. Trip strips 236 may also provide increased surface area to increase heat transfer between internal suction-side surface 237 and the cooling air. Part of the cooling air flow may then exit through exit passage 240 while the remainder of the cooling air flow is directed into internal pressure-side surface 239.

In various embodiments, cooling air flow may contact internal pressure-side surface 239 at aft end 254 and be directed forward along internal pressure-side surface 239 in a forward direction. The cooling air flow may be directed guided roughly along trip strips 238 towards forward end 256 of internal pressure-side surface 239. Cooling flow at forward end 256 may be directed towards the forward end 250 of internal suction-side surface 237. The cooling flow may then mix with the coolant entering impingement chamber (i.e., flow 234) through cross overs 232 and begin the cycle again. As shown in FIG. 4, flow 235 may travel in a swirling whirlpool or vortex motion within aft impingement chamber 230.

Figure 8:
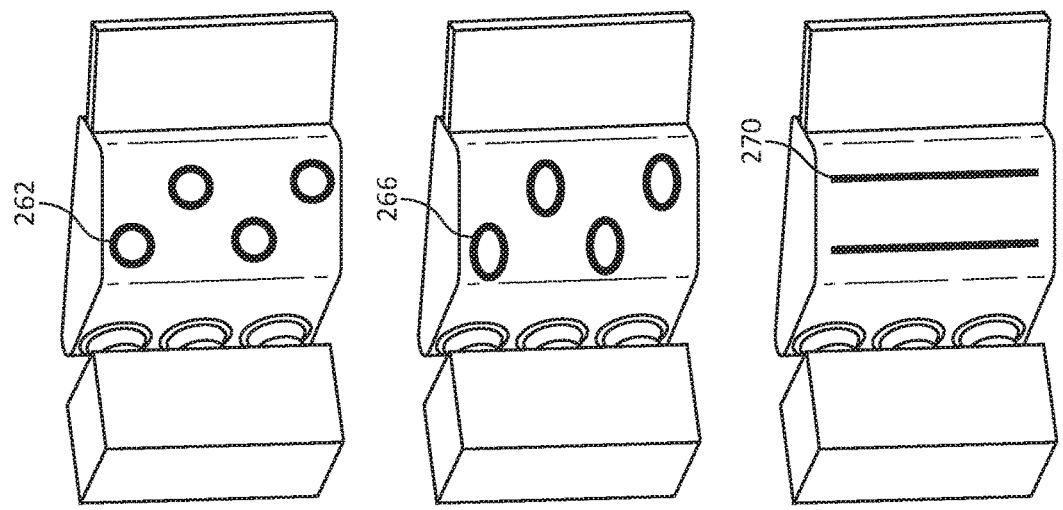
FIG. 8 illustrates various trip strip geometries on a pressure side of an impingement chamber, in accordance with various embodiments.
Figure 8:
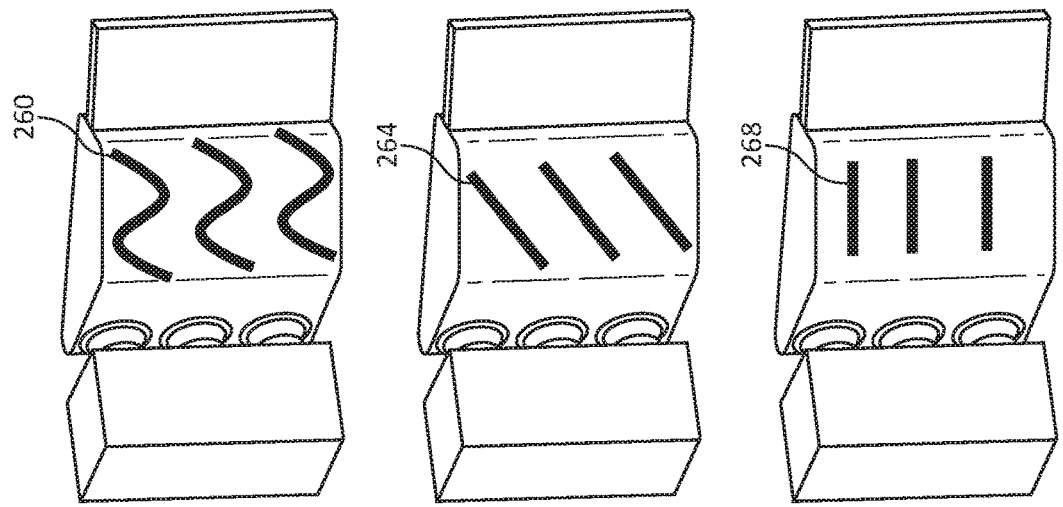
Figure 9:
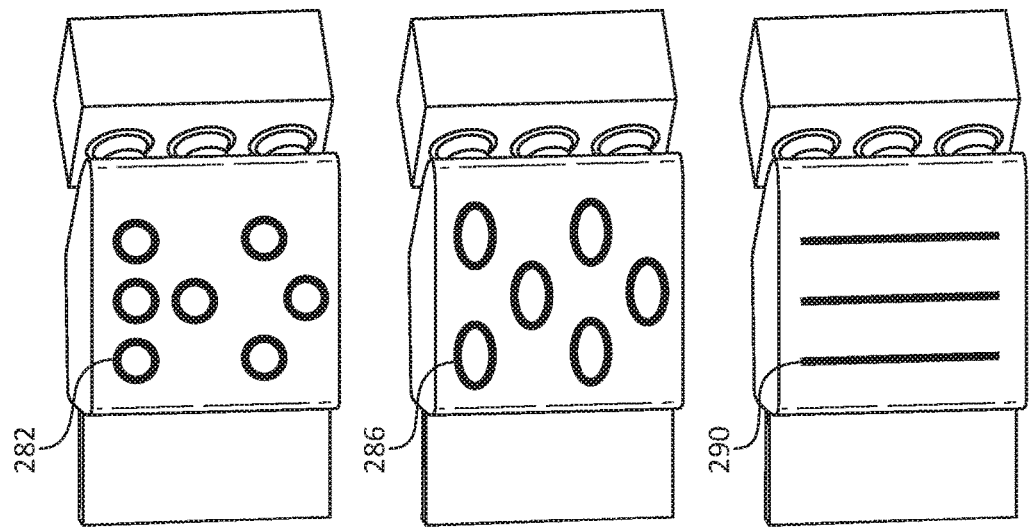
FIG. 9 illustrates various trip strip geometries on a suction side of an impingement chamber, in accordance with various embodiments.
Figure 9:
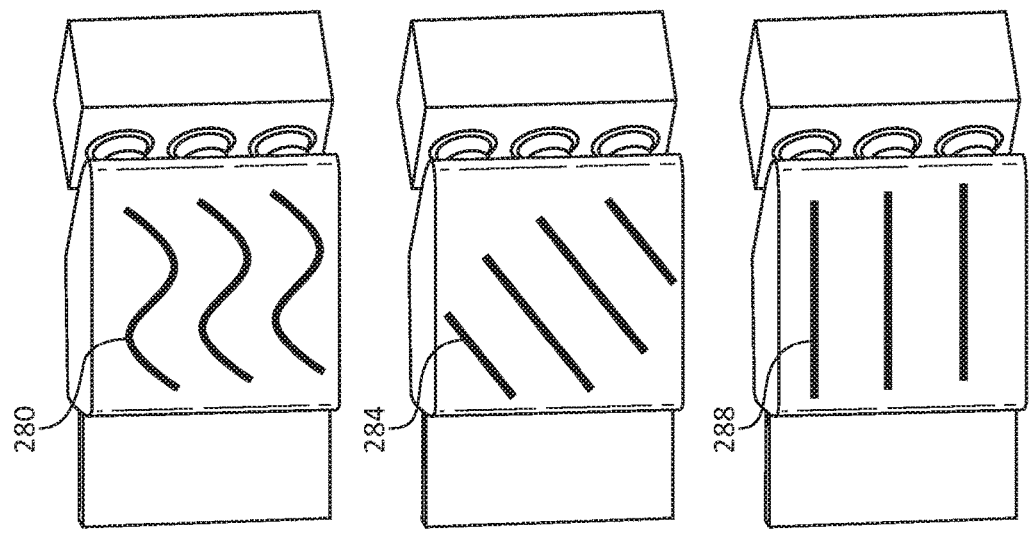

With reference to FIGS. 8 and 9, various trip strip geometries are shown. Trip strips 260 and 280 include wave geometry depicted for opposing surfaces in an impingement chamber. Trip strips 262 and trip strips 282 include circular-platform geometries depicted for opposing surface in an impingement chamber. Trip strips 266 and trip strips 286 include elliptical-platform geometries depicted for opposing surface in an impingement chamber. Trip strips 264, trip strips 268, and trips strips 270 include linear geometries in various orientations, as do trip strips 284, trip strips 288, and trip strips 290. Each geometric variation of the trips strips may be used in conjunction with other geometries on the same surfaces. For example, a surface may have a mix of trip strips 282 with a wave geometry and trip strips 284 with a linear geometry. Similarly, trips strips on opposing surfaces may vary. For example, trip strips 260 having wave geometry may be on a first surface of an impingement chamber while trip strips 282 having circular-platform geometry may be on the opposite surface. Furthermore, this disclosure contemplates any trip strip geometry being deployed in an impingement chamber.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An airfoil, comprising:
    an internal cavity;
    an impingement chamber proximate the internal cavity and in fluid communication with the cavity via a cross over, wherein the cross over is configured to direct a coolant as a jet towards a suction-side surface of the impingement chamber;
    a first trip strip disposed on the suction-side surface of the impingement chamber, wherein the first trip strip has a first geometry selected from a group consisting of at least one of: a v-shaped geometry having a point of the v-shaped geometry oriented relatively downward along an axial extent of the impingement chamber away from a tip of the airfoil, a circular geometry, a wave geometry, an annular elliptical geometry, or a linear geometry non-parallel and non-orthogonal to the axial extent of the impingement chamber; and
    a second trip strip disposed on a pressure-side surface of the impingement chamber, wherein the second trip strip has a second geometry selected from a group consisting of at least one of: the v-shaped geometry having the point of the v-shaped geometry oriented relatively downward along the axial extent of the impingement chamber away from the tip, the circular geometry, the wave geometry, the annular elliptical geometry, or the linear geometry non-parallel and non-orthogonal to the axial extent of the impingement chamber, wherein the first geometry and the second geometry are different.

2. The airfoil of claim 1, wherein the impingement chamber comprises a multi-walled geometry, wherein a portion of the coolant impinging on the suction-side surface flows along the second trip strip from an aft end of the pressure-side surface toward a forward end of the pressure-side surface, is entrained by the jet, and is redirected toward the suction-side surface.

3. The airfoil of claim 2, wherein the first geometry and the second geometry consist of at least one of the v-shaped geometry having the point of the v-shaped geometry oriented relatively downward along the axial extent of the impingement chamber away from the tip, the circular geometry, the wave geometry, or the annular elliptical geometry, wherein the multi-walled geometry further comprises an angular geometry.

4. The airfoil of claim 2, wherein the first trip strip and the second trip strip are configured to direct the coolant flow in a vortex motion.

5. The airfoil of claim 1, wherein the first trip strip is configured to direct a first portion of the coolant flow into the exit passage and a second portion of the coolant flow to the second trip strip.

6. The airfoil of claim 1, wherein the impingement chamber comprises an aft-most internal wall of the airfoil.

7. The airfoil of claim 6, wherein the impingement chamber further comprises an exit passage extending from the aft-most internal wall through a trailing edge of the airfoil and in fluid communication with the impingement chamber.

8. The airfoil of claim 1, wherein the second trip strip is configured to direct the coolant impinging on the suction-side surface along the second trip strip from an aft end of the pressure-side surface distal of the cross over toward a forward end of the pressure-side surface proximate the cross over.

9. A cooling system, comprising:
    an impingement chamber;
    a first trip strip disposed on a first surface of the impingement chamber, wherein the first trip strip has a first geometry selected from a group consisting of at least one of: a v-shaped geometry having a point of the v-shaped geometry oriented relatively downward along an axial extent of the impingement chamber away from an end of the impingement chamber, a circular geometry, a wave geometry, an annular elliptical geometry, or a linear geometry non-parallel and non-orthogonal to the axial extent of the impingement chamber; and
    a second trip strip disposed on a second surface of the impingement chamber, wherein the second trip strip has a second geometry selected from a group consisting of at least one of: the v-shaped geometry having the point of the v-shaped geometry oriented relatively downward along the axial extent of the impingement chamber away from the end, the circular geometry, the wave geometry, the annular elliptical geometry, or the linear geometry non-parallel and non-orthogonal to the axial extent of the impingement chamber, wherein the first geometry and the second geometry are different,
    wherein the impingement chamber further comprises a cross over channel in fluid communication with the impingement chamber, wherein the channel is oriented at an angle relative to the first surface and is configured to direct a coolant as a jet towards a suction-side surface of the impingement chamber.

10. The cooling system of claim 9, wherein the channel is configured to direct the cooling fluid onto the first trip strip and the first surface of the impingement chamber.

11. The cooling system of claim 9, further comprising an exit passage in fluid communication with the first trip strip and the second trip strip.

12. The cooling system of claim 11, wherein the first trip strip is configured to direct a first portion of a cooling fluid into the exit passage and a second portion of the cooling fluid to the second trip strip.

13. The cooling system of claim 9, wherein the first trip strip and the second trip strip are configured to direct cooling fluid in a vortex motion in the impingement chamber.

14. An internally cooled engine part, comprising:
an internal cavity;
a cross over in fluid communication with the internal cavity;
an impingement chamber in fluid communication with the cross over, wherein the cross over is configured to direct air towards a suction-side surface of the impingement chamber as a jet;
a first trip strip disposed on the suction-side surface of the impingement chamber, wherein the first trip strip has a first geometry selected from a group consisting of at least one of: a v-shaped geometry having a point of the v-shaped geometry oriented relatively downward along an axial extent of the impingement chamber away from the a tip of the engine part, a circular geometry, a wave geometry, an annular elliptical geometry, or linear geometry non-parallel and non-orthogonal to the axial extent of the impingement chamber, wherein the first trip strip is configured to direct the air impinging on the suction-side surface across the suction-side surface of the impingement chamber; and
a second trip strip disposed on a pressure-side surface of the impingement chamber, wherein the second trip strip has a second geometry selected from a group consisting of at least one of: the v-shaped geometry having the point of the v-shaped geometry oriented relatively downward along the axial extent of the impingement chamber away from the tip, the circular geometry, the wave geometry, the annular elliptical geometry, or the linear geometry non-parallel and non-orthogonal to the axial extent of the impingement chamber, wherein the first geometry and the second geometry are different.

15. The internally cooled engine part of claim 14, wherein the pressure-side surface is opposite the suction-side surface, wherein the impingement chamber comprises a multi-walled geometry, and wherein a portion of the air impinging on the suction-side surface flows along the second trip strip from an aft end of the pressure-side surface toward a forward end of the pressure-side surface, is entrained by the jet, and is redirected toward the suction-side surface.

16. The internally cooled engine part of claim 15, wherein the first trip strip and the second trip strip are configured to direct the air in a vortex motion in the impingement chamber, wherein the multi-walled geometry further comprises one of an angular geometry.

17. The internally cooled engine part of claim 14, wherein the first geometry and the second geometry consist of at least one of the v-shaped geometry having the point of the v-shaped geometry oriented relatively downward along the axial extent of the impingement chamber away from the tip, the circular geometry, the wave geometry, or the annular elliptical geometry.

* * * * *